United States Patent [19]
Mawby et al.

[11] Patent Number: 5,359,795
[45] Date of Patent: Nov. 1, 1994

[54] REFRIGERATOR DOOR CONSTRUCTION

[75] Inventors: Harold S. Mawby, Belding; David J. Donaghy, Gowen; Rick L. Gunderson, Greenville; Thomas Frost, Ionia; Ace Fairchild, Lowell; Marvin L. Spohn, Gowen, all of Mich.

[73] Assignee: White Consolidated Industries, Inc., Cleveland, Ohio

[21] Appl. No.: 25,285

[22] Filed: Mar. 2, 1993

[51] Int. Cl.⁵ ............................................. F25D 23/02
[52] U.S. Cl. .................................... 40/405; 49/171
[58] Field of Search .......... 312/401, 404, 405, 405.1, 312/406, 402; 49/70, 171; 62/137, 338, 339, 382, 389

[56] References Cited

U.S. PATENT DOCUMENTS

| | | | |
|---|---|---|---|
| 3,429,140 | 2/1969 | White | 62/339 |
| 4,955,675 | 11/1990 | Donaghy . | |
| 5,209,082 | 5/1993 | Ha | 312/401 X |
| 5,263,509 | 11/1993 | Cherry et al. | 312/401 X |
| 5,269,154 | 12/1993 | Schmidt | 62/389 X |

Primary Examiner—Brian K. Green
Attorney, Agent, or Firm—Pearne, Gordon, McCoy & Granger

[57] ABSTRACT

An insulated door for use in a refrigerator having an ice and water through the door dispenser is made by attaching a liner for housing the dispenser on the rear face of the door in line with a front opening. The liner is secured to the door as are the hinge bearings and a tube extends between the liner and the lower hinge bearing for conducting electrical wires and a water tube. The only opening in the liner is at a point to receive ice cubes from the dispenser in the refrigerator and this opening is covered prior to foaming. The door is placed in a foaming fixture which completely enclosed and supports the door and the liner and foam is injected so that the foam, when expanded and hardened, completely covers the rear face of the door. After the door is removed from the foaming fixture, the thin layer of foam at the inlet opening is cut away and the door is completed by adding the liner and the gaskets and other hardware as well as the dispensing unit itself.

8 Claims, 4 Drawing Sheets

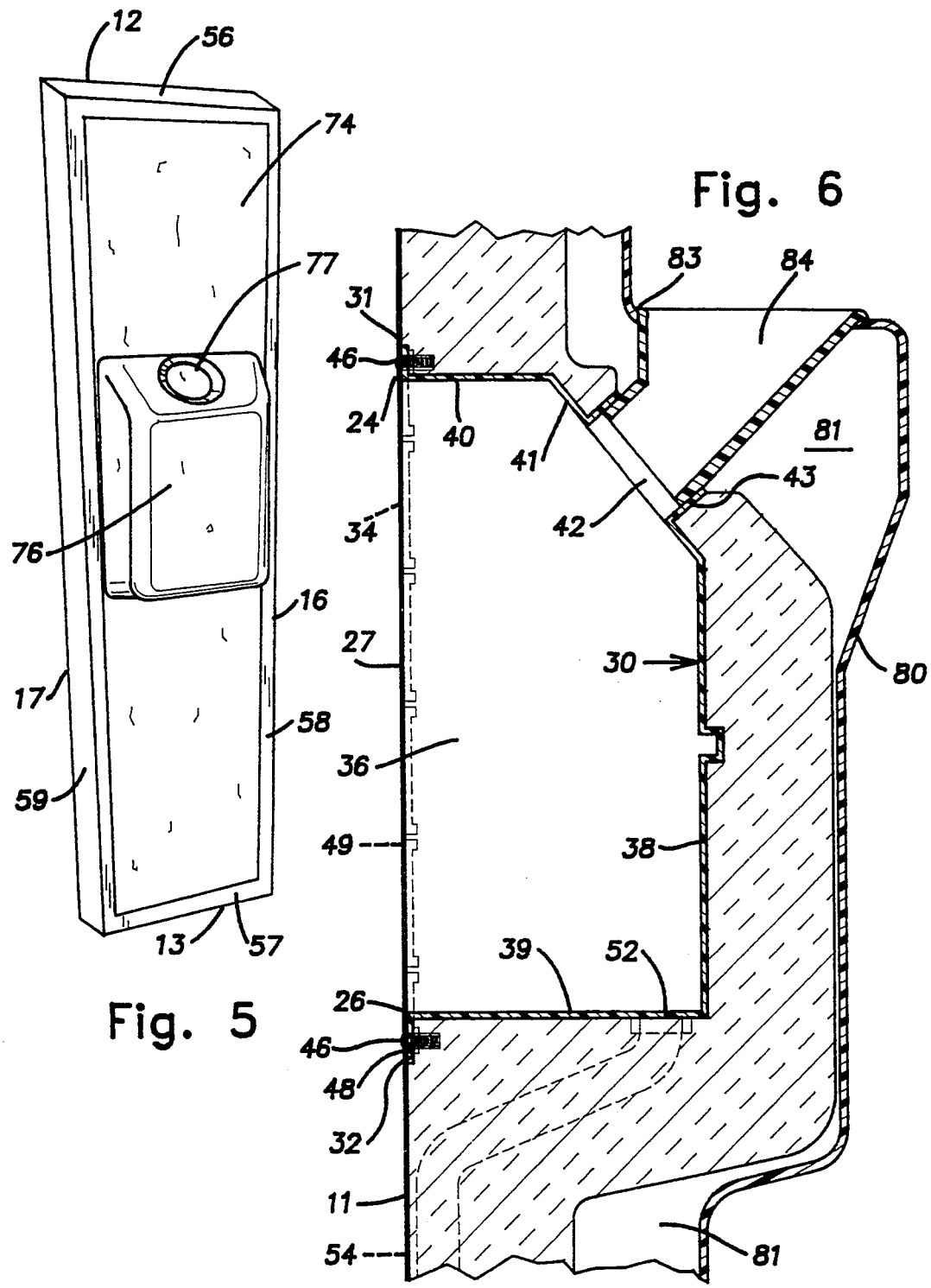

REFRIGERATOR DOOR CONSTRUCTION

BACKGROUND OF THE INVENTION

This invention relates generally to insulated refrigerator door panels, and more particularly to refrigerator doors having a dispensing mechanism such as ice and water dispensers mounted in the door for access from the exterior of the refrigerator without the need for opening the door itself.

Refrigerator doors are generally formed from an outer panel or shell formed from sheet metal which generally may be prepainted prior to forming. This shell is formed from a single piece of sheet metal such as steel to define a rectangular front face, with inturned edges that form the sides, top and bottom of the door panel. The sheet metal is further bent inwardly around all four sides to define a short lip extending parallel to but spaced from the front panel face. The door also includes a liner, preferably formed from plastic, shaped to provide shelves and other storage features on the inner face and this panel is attached to the inturned lips of the shell by fasteners which also serve to hold in place a magnetic rubber gasket that serves not only as a seal between the door and the rest of the cabinet but, as a result of magnetic attraction, holds the door in a closed position.

The space between the liner and the shell is generally filled with insulation, and while fiberglass has been used in the past, it has been found that superior results are obtained by using a rigid insulating polyurethane foam which generally forms a layer the thickness of the shell between the face and the inturned lips and such arrangement has been shown in the patent of David J. Donaghy, U.S. Pat. No. 4,955,675, granted Sept. 11, 1990 and assigned to the Assignee of the present invention. The use of such foamed in place polyurethane foam not only provides improved insulating values necessary for increased energy efficiency that is now required for appliances such as refrigerators, and also provides increased rigidity to the door by bonding to the liner so that the liner can use thinner metal without loss of strength.

The above described arrangement has worked quite satisfactorily with doors having a flat, uninterrupted face but heretofore has not been suitable in the case of refrigerator doors that have an ice and water dispensing unit mounted in one of the doors. These units are usually mounted in the freezer door on a side-by-side refrigerator but are also used on large top freezer refrigerators, in which case the dispenser is mounted on the lower or food compartment door.

In addition to problems of mounting the dispensing unit itself on the door, it is also necessary to provide a water tube and electrical connection to the rest of the refrigerator to supply water to the dispensing unit and electrical signals to the water valve and to the ice ejecting mechanism which delivers ice from the bin supplied by the ice maker to the exterior. Furthermore, it is necessary to provide a moveable door to open and close to allow the ice to be dispensed while sealing to prevent any outside air from entering the refrigerator. Thus, it has been difficult to assemble and to insulate the dispensing unit, and heretofore, the insulation around the dispenser has generally been formed from separate pieces which must be assembled after the dispensing unit has been mounted on the door and held in place when the interior liner of the door is attached. This not only results in increased cost of manufacture, but generally results in a poorer overall insulation performance causing greater heat loss than through a normal door without the dispensing unit.

SUMMARY OF THE INVENTION

The preferred embodiment of the present invention provides an improved insulated door having a dispensing unit mounted therein. The door has a shell formed from sheet metal, which may be prepainted, to have a flat face that is rectangular in shape and having inturned edges along each of the sides forming the top, bottom and sides of the door and the material of the door further extends to form an inturned lip extending toward the exterior of the door along each of the sides and parallel to the front face. A rectangular opening is formed at the location of the dispenser in the front face of the door, and a number of small holes are formed in the front face around the rectangular opening.

A dispenser liner is formed as a unitary piece, preferably from a suitable flame resistant plastic material such as ABS plastic or high impact polystyrene, or metal, shaped to provide a recess adapted to completely receive a separate housing having the ice and water controls and dispensing units that will be accessible to the user through the front of the door. This liner defines a rectangular front opening substantially the same size as the opening in the front face of the door shell and has a laterally extending flange around this opening adapted to abut against the rear face of the door. While the front face of the flange is smooth to make sealing contact against the sheet metal of the door front face, the rear side of the flange is provided with a number of projecting bosses in alignment with the small holes in the door front face. Some of these bosses are open with a central cylindrical bore while others have a blind bore sealed at the inner end. The latter bosses are for the receipt of a plurality of screws extending from the front face of the door into the bosses to firmly clamp the liner against the door shell. The open bosses, which generally extend along the long or vertical sides of the liner flange, are then sealed on the back face with suitable tape to prevent the escape of foam through these openings.

The liner has two openings, one of which is relatively small and located at a rear corner on the bottom face, and this receives a tube which extends forward toward the door face and downwardly to align with an opening in the bottom side to connect with a hollow hinge pintle. This tube is adapted to later receive the wiring and water tube up through the lower hinge and the tube must necessarily run toward the front face of the door so that the water in the tube is not exposed to the low temperature of the freezer compartment to ensure that it will not freeze.

On the upper rear face of the dispenser liner is a short cylindrical extension defining a chute or opening through which the ice will pass when the dispensing mechanism is in place. This opening is covered with suitable sealing tape to prevent foam from entering the interior of the liner.

When the door is ready for foaming, after the liner and tube have been assembled, it is placed on a foaming fixture in a face down position. The fixture has a suitable support block extending up into the interior of the liner to give complete support to the liner walls to avoid collapse from the foam. The fixture includes an upper platen which will define the inner foam surface adjacent the interior liner of the door and the upper platen, which is covered with a suitable release sheet which will not stick to the foam and makes sealing contact around the inturned lips of the liner. This upper platen then has a recess above the insert liner spaced sufficiently far away from the liner to allow a suitable insulating space over the entire inner surface of the door as defined by the top, bottom and sides of the door. Prior to the closing of the platen, a premeasured amount of premixed foam material in liquid form is placed within the mold which is then closed. In accordance with the usual practice, the insulating material, preferably a polyurethane foam, will first expand to fill the space and then harden, after which the fixture may be opened and the foamed door removed.

At this point, the door has the interior filled with a hardened rigid polyurethane foam extending the thickness of the door between the front face and the inturned flange around the edges and extending upward in a hump over the liner so that it covers the area in unbroken fashion side to side and top to bottom. However, the area around the ice chute opening is relatively thin and may then be cut out to allow further assembly of the complete door.

When the dispenser housing is assembled entirely through the front face, wires and the water tube will have first been inserted from the outside through the hinge pintle and through the tube in the door into the interior space defined by the liner. These wires and the water tube are then connected to the dispenser unit and its housing is then secured directly to the liner by suitable screws as shown in the co-pending application for U.S. Pat. No. 07/969,995, filed Nov. 2, 1992. After this is done, the door inner liner, the sealing gasket, hinge member and handles can then be assembled in place to complete the door.

BRIEF DESCRIPTION OF THE DRAWINGS

FIG. 5 is a perspective view of the rear face of the door after foaming has been completed; and FIG. 6 is an enlarged fragmentary cross-sectional view of the foamed door with the door liner in place.

DETAILED DESCRIPTION OF THE PREFERRED EMBODIMENT

Figure 1:
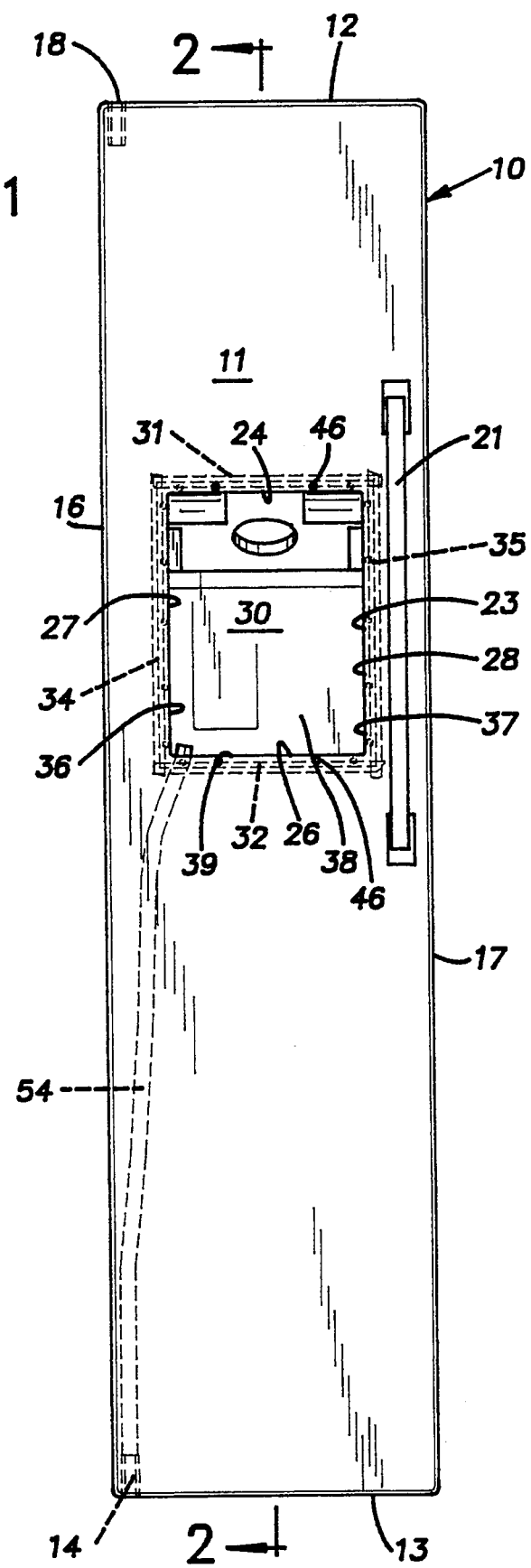
FIG. 1 is a front elevational view of the freezer door of a side by side refrigerator showing the dispenser liner in place prior to assembly of the dispensing mechanism housing.
Figure 2:
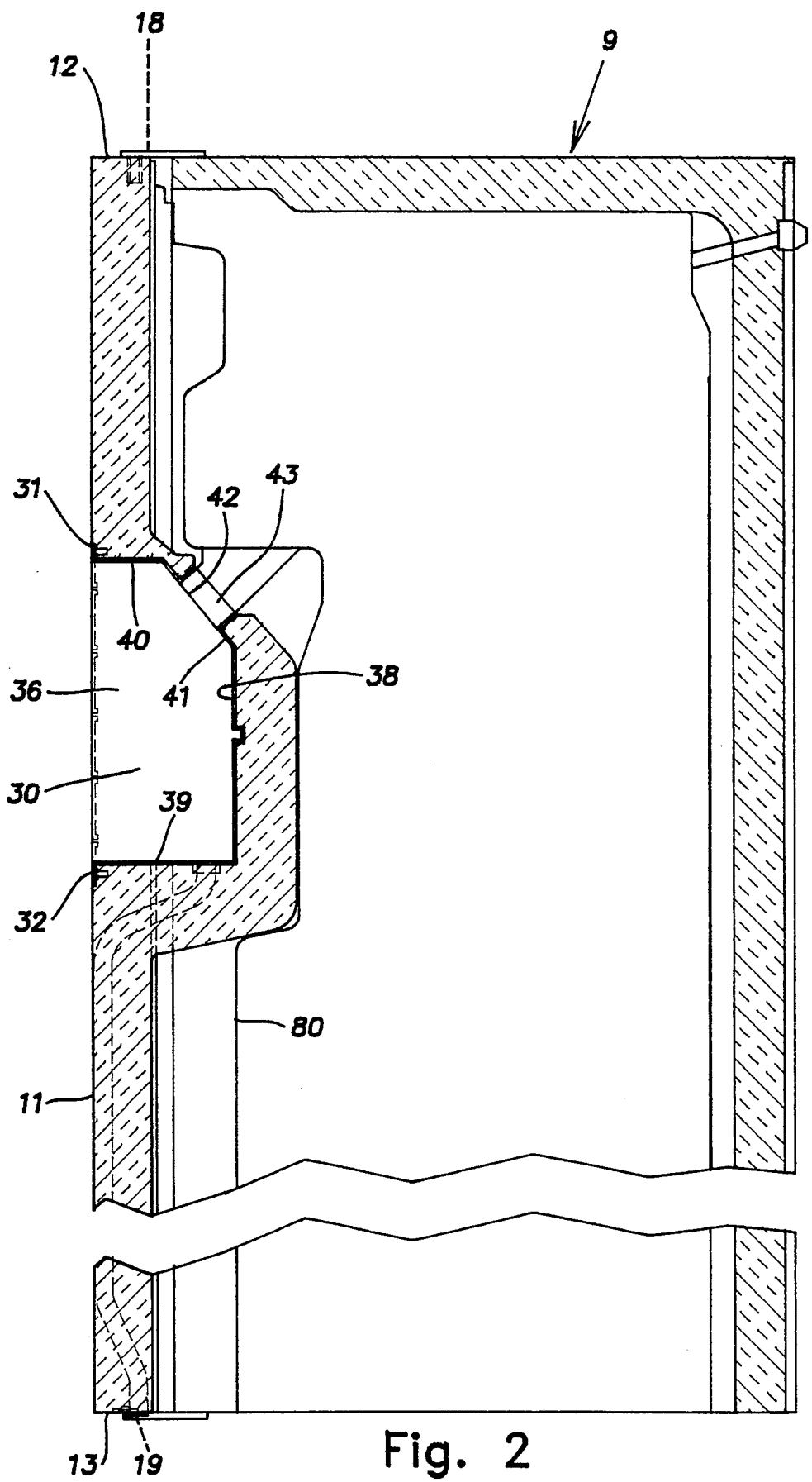
FIG. 2 is a vertical cross-sectional view through a refrigerator cabinet and the door of FIG. 1.

Referring now to the drawings in greater detail, FIGS. 1 and 2 show the freezer compartment door of a side by side household refrigerator 9. The door 10 includes a flat front face 11 formed preferably from sheet steel which may or may not be textured. The door 10 is generally rectangular in shape to have top and bottom sides 12 and 13 and left and right sides 16 and 17, respectively, that are parallel to each other. In such refrigerators, the freezer is usually on the left hand side, when facing the refrigerator, and accordingly, the door 10 has top and bottom bearing bushings 18 and 19 formed in the top and bottom sides adjacent the left side 16. A handle 21 may be placed on the front face adjacent the right side 17, but this handle is only assembled after the door has been foamed as will be described in greater detail hereinafter.

If the freezer door has an ice and water through the door dispenser, it is provided with a rectangular opening 23 at the middle of the front face adjacent the handle 21. This opening 23 is also rectangular with parallel top and bottom edges 24 and 26 and parallel left and right sides 27 and 28. A dispenser liner 30 is mounted on the rear face of the door panel in alignment with the opening 23 and serves as a housing for the dispenser unit which is mounted at a later time as well as an interface for the foam insulation.

The liner 30 is preferably formed from a suitable flame resistant plastic material, such as polypropylene, or metal, as a single unitary molded piece in the form of a hollow, rectangular box shaped member having an open side matching the opening 23 in shape and size. Liner 30 has top and bottom flanges 31 and 32 together with left and right flanges 34 and 35 which fit against the edges of the opening 23 to make abutting contact with the rear surface of the door front face 11. Liner 30 is formed with a pair of left and right side walls 36 and 37 extending back from the left and right flanges 34 and 35, respectively, to intersect with a flat back wall 38 which extends substantially parallel to the door front face 11. A bottom wall 39 extends back from the bottom flange 32 to join the lower edges of the sidewalls 36 and 37 as well as backwall 38. A top wall 40 extends a short distance back from the top flange 31 where it joins a sloping wall portion 41 extending at an angle down to the backwall 38. Sloping portion 41 includes a circular opening 42 which defines the inlet opening through which the ice is received from the ice making unit in the freezer compartment. A collar or tube 43 on the backside of sloping wall portion 41 extends a short distance upward and backward from the sloping wall portion.

Before the foaming operation, the dispenser liner 30 is assembled to the door with the flanges in contact with the rear surface of the front face 11 and held in place by screws 46 (see FIG. 1) which extend through the door panel into screw bosses 48 formed on the top and bottom flanges 31 and 32. These bosses are closed with a blind bore and extend backward from the flanges. On the side flanges 34 and 35, open bosses 49 are provided to align with holes on the front face to aid in the mounting of the dispenser unit.

It should be noted that the bottom wall 39 has an opening 52 adjacent one rear corner. A tube 54, preferably formed from suitable plastic material is assembled to the door with the upper end extending through opening 52 and the lower end connected to the bottom hinge bearing 19. This tube will contain the wires and water supply tube and conduct them from the bottom hinge to the dispenser unit as generally shown in the U.S. patent of Harold S. Mawby et al. U.S. Pat. No. 4,543,800, granted Oct. 1, 1985. The tube 54 runs along the rear surface of the front face 11 to assure that it will be exposed to room temperature to avoid any possible freezing of the water in the supply tube.

It should be noted that the door panel has lip portions extending inward from the sides and therefore has a lip 56 extending inward from the top side as well as another lip 57 from the bottom side. Likewise, lips 58 and 59 extend from the left and right sides 16 and 17, respectively. These lips, which are bent to extend parallel to the front face, increase the rigidity of the panel and also serve for the mounting of the door gasket and the inner door liner when the door is completed.

Figure 3:
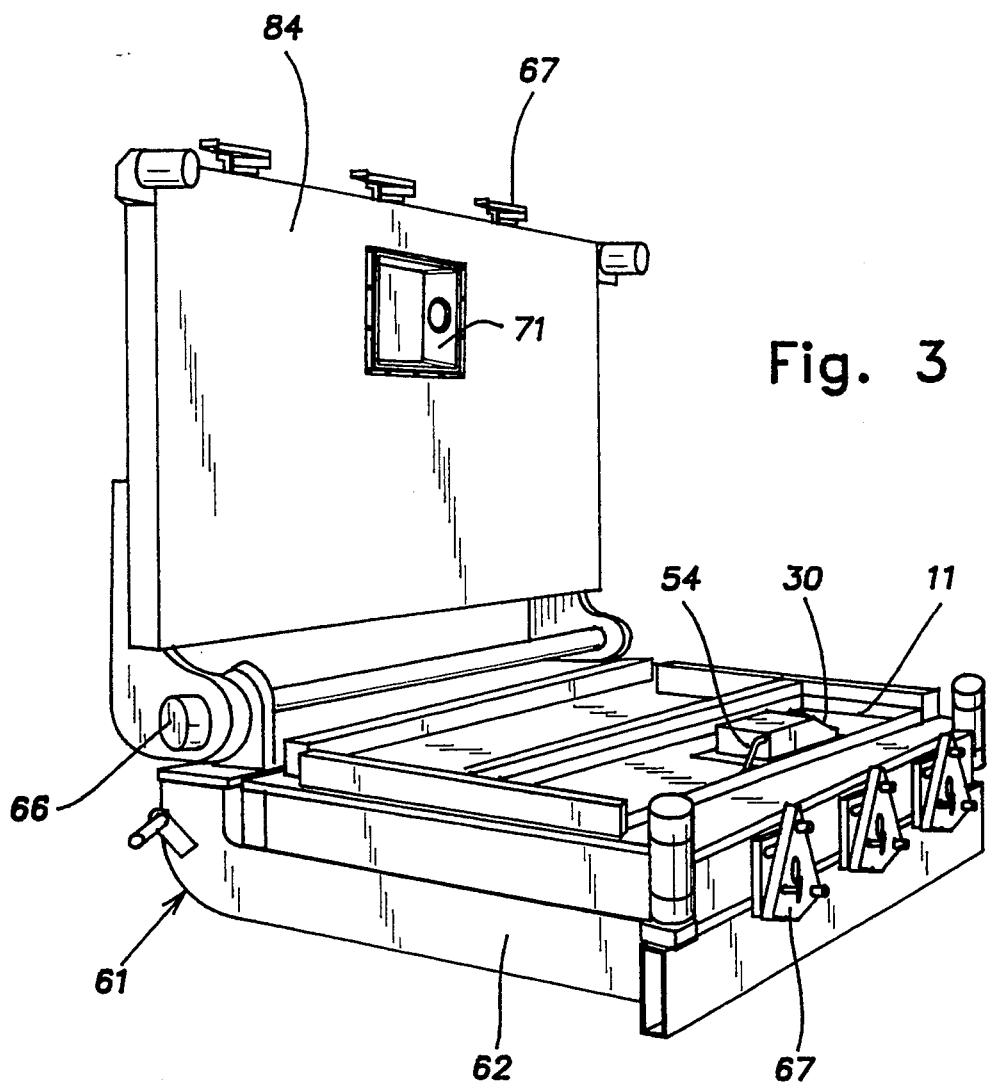
FIG. 3 is a perspective view of a foaming fixture with a door assembly in place prior to foaming with the platen in the open position.
Figure 4:
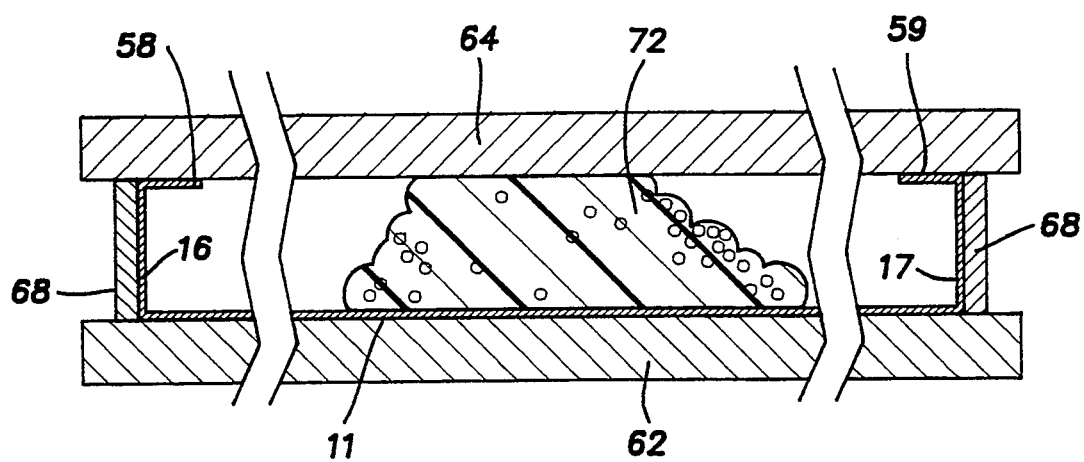
FIG. 4 is a fragmentary schematic view of the foaming fixture showing the door in place with the platen closed before the foam has started to expand.

After the liner 30 is assembled in place on the door, the unit is placed in a foaming fixture and shown in FIGS. 3 and 4. The fixture 61 includes a fixed lower platen 62 and an upper platen 64 which is mounted on a hinge mechanism 66 and when closed, is locked in place by suitable latches 67. The fixture 61 also includes side walls 68 which contact the door sides to support the door during foaming because of the high pressures of the expanding foam would otherwise warp and distort the door. The upper platen 64 is provided with an insert 71 which can be merely a flat plate when a door without the dispenser housing is foamed. However, when the door being foamed is of the ice and water dispenser type, the insert 71 comprises a large recess which, when the fixture is closed, will be spaced away from the dispenser liner 30, a distance equal to the intended thickness of the foam insulation at that point.

When an ice and water dispensing type door is to be foamed, the insert 71 is placed in the upper platen and a similar insert (not shown) is placed on a lower platen 62 to support the liner 30 and prevent distortion from the forces of the expanding foam. The door 10 with the liner 30, hinge bearings 18 and 19, and tube 54 assembled in place is then placed face down in the fixture 61 as shown in FIG. 3. In order to prevent the foam from sticking to the upper platen 64 and insert 71, these may either be coated with a non-stick or release compound or a thin film of suitable plastic material which does not stick to the foam is placed over the upper platen, a charge of foam is then placed near the center of the door as shown in FIG. 4 after which the upper platen is quickly closed and latched with the latches 67. The foam is then allowed to expand and harden until it fills the entire available area. Vents may be provided at appropriate places to insure that the space within the door is completely filled with foam.

After the foam is hardened, the fixture is opened and the completed door can then be removed. It will then appear approximately as shown in FIG. 5 with the surface of the foam 74 substantially flush with the lips 56, 57, 58 and 59, except in the area of the liner 30 where it will be raised up as shown at 76 as determined by the shape of the insert 71. The surface 76 should consist of sloping surfaces with sufficient draft to ensure that the upper platen can be easily raised without damage to any of the foam surface. As a result of the shape of the insert 71, a depression 77 is in alignment with the collar 43 and opening 42 and while this area is filled with foam, the foam layer here is relatively thin and is then simply cut away with a knife to allow the opening 42 to extend all the way through the foam. The tube 54 will be completely covered by the foam layer and preferably remain in contact with the front face 11.

After this is done, the inner door liner 80 may be assembled in place along with the door gasket (not shown). The liner 80 is shaped to provide suitable shelves and other arrangements and therefore has a rather sculpted shape to provide the necessary shelf and mounting surfaces. For this reason, the liner 80 does not conform to the shape of the foam surface 74 and there will be a number of open voids 81 where the liner is spaced from the foam surface, If desired, these voids may be filled with additional insulation such as fiber glass or the like, but in any case, if no additional insulation is present, the foam thickness is sufficient to provide a completely insulated door. The liner will also have an opening 83 on its surface through which can be assembled a chute 84 generally conical in shape which will fit within the collar 43 and provide a suitable transition passage for the ice pieces as they are dispensed from the internal mechanism to the dispenser mechanism mounted within the dispenser liner 30 as shown in the above mentioned application, Ser. No. 07/969,995.

As a result of this foaming arrangement, the door insulation is of the highest quality with adequate thickness of polyurethane foam formed as an intregal piece without spaces or interstices between pieces and extends in unbroken fashion from top to bottom and side to side except for the opening for the chute 84.

Although the preferred embodiment of this invention has been shown and described in detail, it is recognized that other modifications and rearrangements may be resorted to without departing from the scope of the invention as defined in the claims.

What we claim is:

1. An insulated door for a refrigerator, said door having a rectangular front face, said door having a front panel of sheet material forming the rectangular front face of the door, said panel having front and rear sides and having inturned edges along each side forming the top, bottom and sides of the door, each of said edges terminating in an inturned lip extending in a plane parallel to said front face, an opening in said front face, a dispenser liner secured in abutting relation to the rear side of said front panel and extending completely over said opening, fastener means extending through said front face clamp said liner in place, said liner having an inlet opening at a rear of said door, said liner extending rearwardly beyond said inturned lips, and a layer of rigid insulating foam in contact with the rear side of said front panel said inturned edges, said inturned lips and said liner, said foam layer being unbroken and uninterrupted except for an opening at said inlet opening, said opening in said foam layer being slightly larger than said inlet opening.

2. An insulated door as set forth in claim 1, including upper and lower hinge bearing members in said top and bottom sides.

3. An insulated door as set forth in claim 2, including a tube extending between said liner and one of said hinge bearing members within said foam layer.

4. An insulated door as set forth in claim 3, wherein said one hinge bearing member is the lower hinge bearing member and said tube connects to said liner.

5. An insulated door as set forth in claim 1, including a collar on said liner around said inlet opening extending into said foam layer.

6. An insulated door as set forth in claim 1, wherein said liner is in the form of a rectangular box having top, bottom, side and back wall portions.

7. An insulated door as set forth in claim 6, wherein said liner includes a sloping wall portion interconnecting said top and back wall portions.

8. An insulated door as set forth in claim 7, wherein said inlet opening is on said sloping wall.

* * * * *

UNITED STATES PATENT AND TRADEMARK OFFICE
CERTIFICATE OF CORRECTION

PATENT NO. : 5,359,795

DATED : November 1, 1994

INVENTOR(S) : Mawby et al.

It is certified that error appears in the above-identified patent and that said Letters Patent is hereby corrected as shown below:

Column 5, line 65, delete "surface," and insert --surface.--.

Column 6, line 36, (Claim 1, line 12), after "face" insert --to--.

Signed and Sealed this

Thirty-first Day of January, 1995

Attest:

BRUCE LEHMAN

*Attesting Officer*     *Commissioner of Patents and Trademarks*